United States Patent
Sjöland et al.

(10) Patent No.: US 11,943,713 B2
(45) Date of Patent: Mar. 26, 2024

(54) WAKEUP RECEIVER AND WAKEUP SIGNAL TRANSMISSION

(71) Applicant: Telefonaktiebolaget LM Ericsson (publ), Stockholm (SE)

(72) Inventors: Henrik Sjöland, Lund (SE); Leif Wilhelmsson, Lund (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 398 days.

(21) Appl. No.: 17/413,144

(22) PCT Filed: Dec. 13, 2018

(86) PCT No.: PCT/EP2018/084850
§ 371 (c)(1),
(2) Date: Jun. 11, 2021

(87) PCT Pub. No.: WO2020/119913
PCT Pub. Date: Jun. 18, 2020

(65) Prior Publication Data
US 2022/0030518 A1 Jan. 27, 2022

(51) Int. Cl.
H04W 52/02 (2009.01)
H04W 72/0453 (2023.01)

(52) U.S. Cl.
CPC ... *H04W 52/0229* (2013.01); *H04W 72/0453* (2013.01)

(58) Field of Classification Search
CPC ......... H04W 52/0229; H04W 52/0235; H04W 72/0453; Y02D 30/70
See application file for complete search history.

(56) References Cited

U.S. PATENT DOCUMENTS 9,065,698 B2 * 6/2015 Shirakata ............... H04L 25/49
2006/0274698 A1 12/2006 Twitchell, Jr.
(Continued)

FOREIGN PATENT DOCUMENTS

EP 1164708 A2 12/2001
JP 2011049721 A 3/2011
(Continued)

OTHER PUBLICATIONS

Sjoland, H. et al., "Ultra Low Power Transceivers for Wireless Sensors and Body Area Networks", 8th International Symposium on Medical Information and Communication Technology, Apr. 2-4, 2014, pp. 1-5, IEEE.
(Continued)

*Primary Examiner* — Farid Seyedvosoghi
(74) *Attorney, Agent, or Firm* — COATS & BENNETT, PLLC

(57) ABSTRACT

A wireless device features a low-power, limited-functionality, narrowband, homodyne wakeup receiver with a free running local oscillator. This enables a very attractive combination of low power consumption and high selectivity. The network supports these receivers by adopting a wakeup message structure that supports oscillator frequency calibration, and that tolerates loss of parts of the signal spectrum. Wakeup signals are transmitted frequently to allow the wakeup receivers (whether targeted by a wakeup signal or not) to calibrate their LO frequencies. The frequencies of the wakeup signals can be constant, or follow a hopping pattern for increased immunity to interference. The wakeup signals can use multiple carriers to increase robustness to loss of parts of the signal spectrum, particularly near the LO frequency in a homodyne receiver. The carriers use amplitude modulation (OOK), with either different or equal sequences. Having equal sequences provides an opportunity for
(Continued)

increased sensitivity by mixing all carriers to the same frequency before amplitude detection and correlation.

32 Claims, 9 Drawing Sheets

(56) References Cited

U.S. PATENT DOCUMENTS

| | | |
|---|---|---|
| 2011/0182223 A1 | 7/2011 | Patel et al. |
| 2012/0120859 A1 | 5/2012 | Stephens et al. |
| 2015/0087255 A1 | 3/2015 | Wentzloff et al. |
| 2016/0127161 A1 | 5/2016 | Murali et al. |
| 2018/0184379 A1 | 6/2018 | Liu et al. |

FOREIGN PATENT DOCUMENTS

| | | | | |
|---|---|---|---|---|
| WO | WO-2009132425 A1 * | 11/2009 | ............. | A01G 25/16 |
| WO | 2014028247 A1 | 2/2014 | | |
| WO | 2018049924 A1 | 3/2018 | | |
| WO | 2018108264 A1 | 6/2018 | | |
| WO | 2018174941 A1 | 9/2018 | | |
| WO | WO-2018174941 A1 * | 9/2018 | | |
| WO | 2018204908 A1 | 11/2018 | | |
| WO | WO-2020007485 A1 * | 1/2020 | ........... | H04B 1/7143 |

OTHER PUBLICATIONS

Sjoland, H. et al., "A Receiver Architecture for Devices in Wireless Body Area Networks", IEEE Journal on Emerging and Selected Topics in Circuits and Systems, Mar. 2012, pp. 82-95, vol. 2, No. 1.

Pletcher, N. et al., "A 52 uW Wake-Up Receiver With—72 dBm Sensitivity Using an Uncertain-IF Architecture", IEEE Journal of Solid-State Circuits, Jan. 2009, pp. 269-280, vol. 44, No. 1.

Bryant, C. et al., "A 2.45GHz, 50uW Wake-up Receiver Front-end with—88dBm Sensitivity and 250kbps Data Rate", 40th European Solid State Circuits Conference, Sep. 22-26, 2014, pp. 235-238, IEEE.

* cited by examiner

WAKEUP RECEIVER AND WAKEUP SIGNAL TRANSMISSION

TECHNICAL FIELD

The present invention relates generally to wireless communication, and in particular to wakeup receiver techniques for low-power wireless devices.

BACKGROUND

Wireless communication networks, including geographically fixed network nodes and often mobile radio network devices such as cellphones and smartphones, are ubiquitous in many parts of the world. These networks continue to grow in capacity and sophistication. To accommodate both more users and a wider range of types of devices that may benefit from wireless communications, the technical standards governing the operation of wireless communication networks continue to evolve. The fourth generation (4G) of network standards has been deployed, and the fifth generation (5G, also known as New Radio, or NR) is in development.

Cellular wireless communication systems are currently being developed and improved for machine-to-machine (M2M) or machine type communication (MTC), which is characterized by lower demands on data rates than, e.g., mobile broadband, but with higher requirements on aspects such as low cost device design (e.g. below USD $5), and very long battery life (device lifetime). In Release 13, the Third Generation Partnership Project (3GPP) standardized two different approaches to MTC. Enhanced MTC (eMTC), also known as Long Term Evolution—Machine-to-machine (LTE-M), includes cost reduction measures such as lower bandwidth, lower data rates, and reduced transmit power, as compared to legacy (broadband) LTE. Narrowband Internet of Things (NB IoT) more aggressively addresses the extremely low cost market with less than 200 kHz of channel bandwidth and flexibility to deploy concurrently with legacy networks or outside of active legacy spectrum.

An important aspect to M2M and MTC type device design is ultra-low power consumption. For example, it is envisioned that sensors and other devices may be deployed with a battery that outlasts the useful device life, such as 10 years. Another approach to powering M2M/MTC devices is energy scavenging, where power is captured and stored (e.g., in a battery or capacitor) from, e.g., solar cells, temperature or salinity gradients, kinetic energy, and the like. In such devices, power management is a major design concern. Selective activation—e.g., sleep mode—is heavily exploited. While it is straightforward to only activate circuits to serve the device's needs, such as to transmit sensed or accumulated data, connectivity is a two-sided activity, and the device must consume power to "listen" to the network if it is to be reachable.

One approach to conserving power while operating a receiver is to activate it on a duty cycle, with dormant periods between receiver activations. Such a receiver activation duty cycle directly affects the response time—the lower the duty cycle, the longer the network must on average repeat the paging messages to contact the device. Repeated paging messages consume air interface resources, increase interference to other devices, and may cause congestion in heavy traffic loads. A lower duty cycle also necessarily increases the delay for obtaining a response from the device.

Another approach is to utilize a very low-power, limited-function receiver, called a "wakeup" receiver, which is operated at a higher duty cycle (or even continuously) but which consumes far less power than a main receiver. The wake-up receiver's functionality is limited to detecting a wakeup request from the network. Upon such detection, the wake-up receiver alerts the device (e.g., a power management system), which brings the main receiver out of sleep mode to establish connectivity and engage the device's full communications capabilities.

To achieve ultra-low power consumption (e.g., below 100 uW), the wakeup receiver is typically based on amplitude detection of on-off keying (OOK) signals. This avoids the need for highly accurate local oscillator (LO) clock signals, which are typically generated by power-hungry phase locked loop (PLL) circuits. However, due to the resulting inaccuracy and uncertainty in a local oscillator frequency, only relatively wideband filtering can be realized prior to the amplitude detection. In this case, immunity to interference is essentially limited to what can be achieved by correlation of PN-sequences.

Due to the limited amount of filtering prior to amplitude detection, the wakeup receivers are very vulnerable to interference. All interference and noise entering the amplitude detector, having amplitude modulation in the same frequency range as the wakeup message, will mask the signal. It is not necessary that the interference utilize the same frequency channel. Rather, because of the limited ability to filter out signals adjacent to the wakeup signal, signals transmitted in adjacent channels, and potentially even further away (in frequency), will effectively have as detrimental an effect as a co-channel interferer. More narrowband filtering would eliminate most such interference; however the accurate frequency generation required for that would consume significant power, defeating the purpose of the wakeup receiver.

Compounding the interference problem, the amplitude detector is also heavily non-linear and therefore produces very small outputs for weak input signals. For example, assuming a quadratic gain characteristic for small signals means that the signal to noise ratio (SNR) falls off by 20 dB for each reduction of 10 dB of the signal level. With even modest amounts of interference at the detector input, the gain is therefore often insufficient for reliable operation with small input signal amplitudes.

The Background section of this document is provided to place embodiments of the present invention in technological and operational context, to assist those of skill in the art in understanding their scope and utility. Approaches described in the Background section could be pursued, but are not necessarily approaches that have been previously conceived or pursued. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to embodiments of the present invention described and claimed herein, a wireless device features a low-power, limited-functionality, narrowband, homodyne wakeup receiver with a free running local oscillator. This enables a very attractive combination of low power consumption and high selectivity. The network supports these receivers by adopting a wakeup message structure that supports oscillator frequency calibration, and that tolerates loss of parts of the signal spectrum. Wakeup signals are transmitted frequently to allow the wakeup receivers (whether targeted by a wakeup signal or not) to calibrate their LO frequencies. The frequencies of the wakeup signals can be constant, or follow a hopping pattern for increased immunity to interference. The wakeup signals can use multiple carriers to increase robustness to loss of parts of the signal spectrum, particularly near the LO frequency in a homodyne receiver. The carriers use amplitude modulation (OOK), with either different or equal sequences. Having equal sequences provides an opportunity for increased sensitivity by mixing all carriers to the same frequency before amplitude detection and correlation.

One embodiment relates to a method of operating a wireless device operative in a wireless communication network, comprising a primary receiver circuit and a low-power wakeup receiver. Operation of a primary receiver circuit is suspended to conserve power. A low-power wakeup receiver circuit is operated. One or more wakeup signals transmitted by the network are received. The one or more wakeup signals are down-converted using an uncalibrated local oscillator signal. The down-converted one or more wakeup signals are demodulated and decoded. Frequency related information is extracted from the decoded one or more wakeup signals. The local oscillator signal frequency is corrected using the extracted frequency related information. Subsequent wakeup signals transmitted by the network are down-converted using the frequency-corrected local oscillator signal. Narrowband filtering is performed on the down-converted, subsequent wakeup signals. The filtered, down-converted, subsequent wakeup signals are demodulated and decoded.

Another embodiment relates to a wireless device operative in a wireless communication network. The wireless device includes a primary receiver circuit adapted to be suspended to conserve power, and a low-power wakeup receiver circuit adapted to receive and process one or more wakeup signals transmitted by the network. The wakeup receiver circuit includes a digitally controlled oscillator adapted to generate a local oscillator signal; a mixer receiving the local oscillator signal and the received one or more wakeup signals and adapted to frequency down-convert the received one or more wakeup signals; a filter downstream of the mixer; and a digitization and digital processing circuit downstream of the filter and adapted to demodulate and decode the one or more wakeup signals and extract frequency related information from the decoded one or more wakeup signals. The wakeup receiver is adapted to: use the extracted frequency related information to correct the local oscillator signal frequency; use the frequency-corrected local oscillator signal to frequency down-convert subsequent wakeup signals transmitted by the network; perform narrowband filtering on the down-converted subsequent wakeup signals; and demodulate and decode the filtered, down-converted, subsequent wakeup signals.

Yet another embodiment relates to a method operating a base station serving one or more low-power wireless devices in a wireless communication network. One or more wakeup signals are generated. Each wakeup signal includes information related to a transmission frequency. The wakeup signals are transmitted, wherein each wakeup signal is transmitted on a corresponding carrier.

Still another embodiment relates to a base station operative in a wireless communication network. The base station includes a transceiver and processing circuitry operatively connected to the transceiver. The processing circuitry is adapted to generate one or more wakeup signals, each including information related to a transmission frequency; and transmit the wakeup signals, each wakeup signal being transmitted on a corresponding carrier.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practised without limitation to these specific details. In this description, well known methods and structures have not been described in detail so as not to unnecessarily obscure the present invention.

Figure 1:
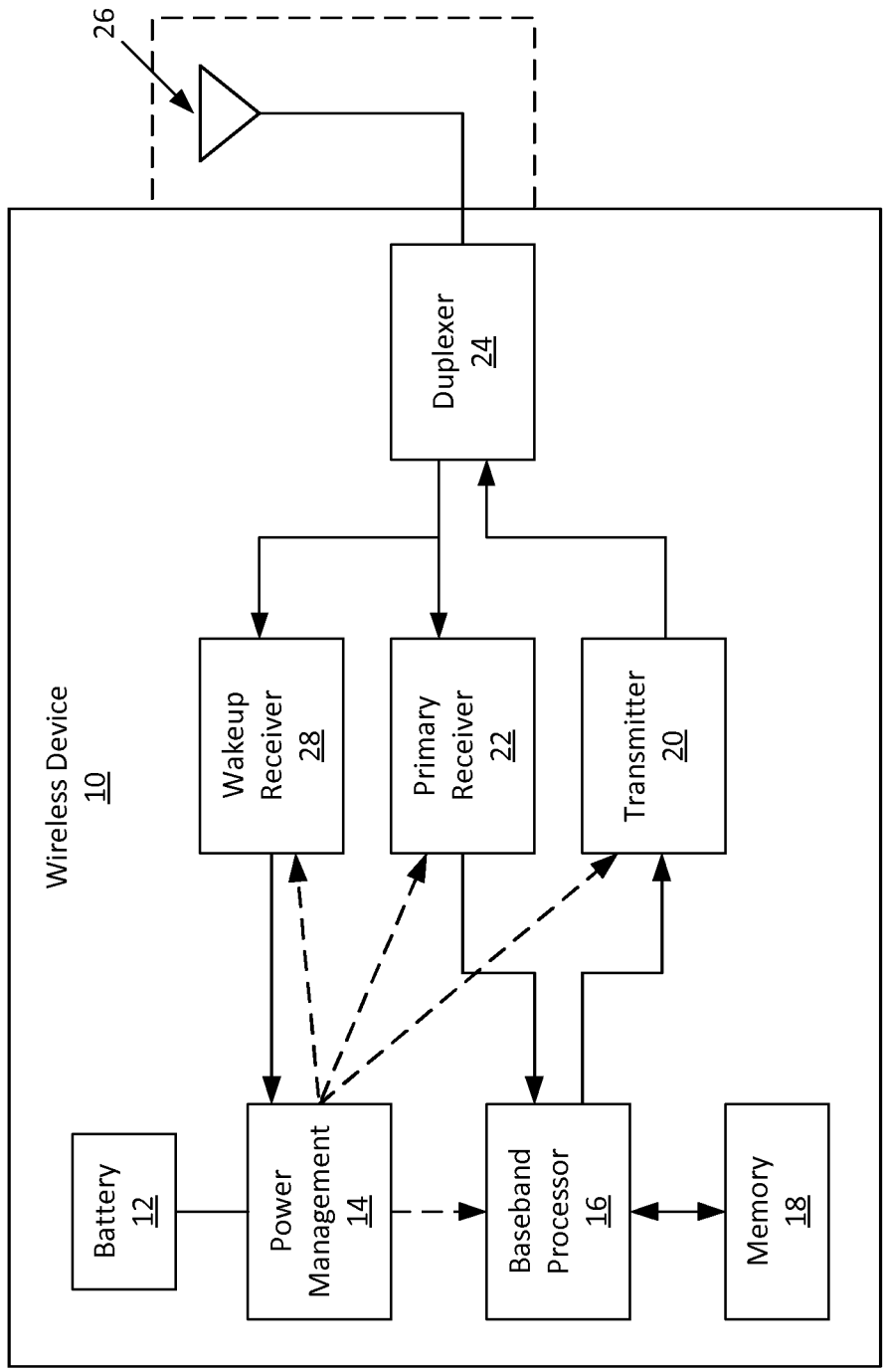
FIG. 1 is a block diagram of a wireless device.

FIG. 1 depicts functional blocks of a wireless device 10 according to one embodiment. The wireless device 10 includes a battery 12 (or power scavenging device), power management circuit 14, and baseband processor 16 connected to memory 18. When actively connected to a wireless network, the baseband processor 16 communicates with the network (e.g., a base station) via a transmitter 20 and primary receiver 22. A duplexer 24 provides isolation between transmit and receive functions, in connecting them both to an antenna 26 (which may be internal or external, as indicated by the dashed lines). In TDD implementations, the duplexer 24 may comprise a switch. Of course, the wireless device 10 may include other functions not depicted in FIG. 1, such as sensors, cameras, monitors, actuators, control circuits, other communication interfaces, a user interface, and the like, depending on the specific purpose of the wireless device 10.

As indicated by dashed arrows, the power management circuit 14 controls the provision of power (and/or clock signals) to other circuits and functions of the wireless device 10. In particular, the power management circuit 14 places circuits in a "sleep," or inactive mode, when the respective functionality is not being currently utilized, to conserve power. As discussed above, the power management circuit 14 may efficiently and accurately control the provision of power to circuits such as the baseband processor 16 and transmitter 20, in response to current computational or outgoing communication demands. However, the wireless device 10 has no knowledge when incoming communications, such as paging messages, may be directed to it from the network, and continuously monitoring the network consumes large amounts of power. While the power management circuit 14 can reduce the power consumption of the primary receiver 22 by operating it in a duty cycle, this results in wasted air interface resources, increased interference, and possible congestion as the network is required to repeatedly transmit paging messages until one coincides with a primary receiver 22 "on" time.

Accordingly, the wireless device includes a wakeup receiver 28. The wakeup receiver 28 is a low-power, limited-functionality circuit, the purpose of which is to monitor the network for an indication of pending transmissions directed to the wireless device 10 when operation of the primary receiver 22 is suspended for power savings. This indication may be in the form of a wakeup signal transmitted by the network and identifying the wireless device 10 (or a group, of which the wireless device 10 is a member). Upon detecting such a signal, the wakeup receiver alerts the power management circuit 14, which in turn activates the primary receiver 22, which e.g., monitors the network for paging messages, performs a random access procedure, or otherwise engages in conventional (power-consuming) communication protocols with the network. When the wireless device 10 completes a task, or otherwise believes no further network transmissions directed to it are likely for a time, the power management circuit 14 again suspends operation of the primary receiver 22, and activates the wakeup receiver 28.

Figure 2:
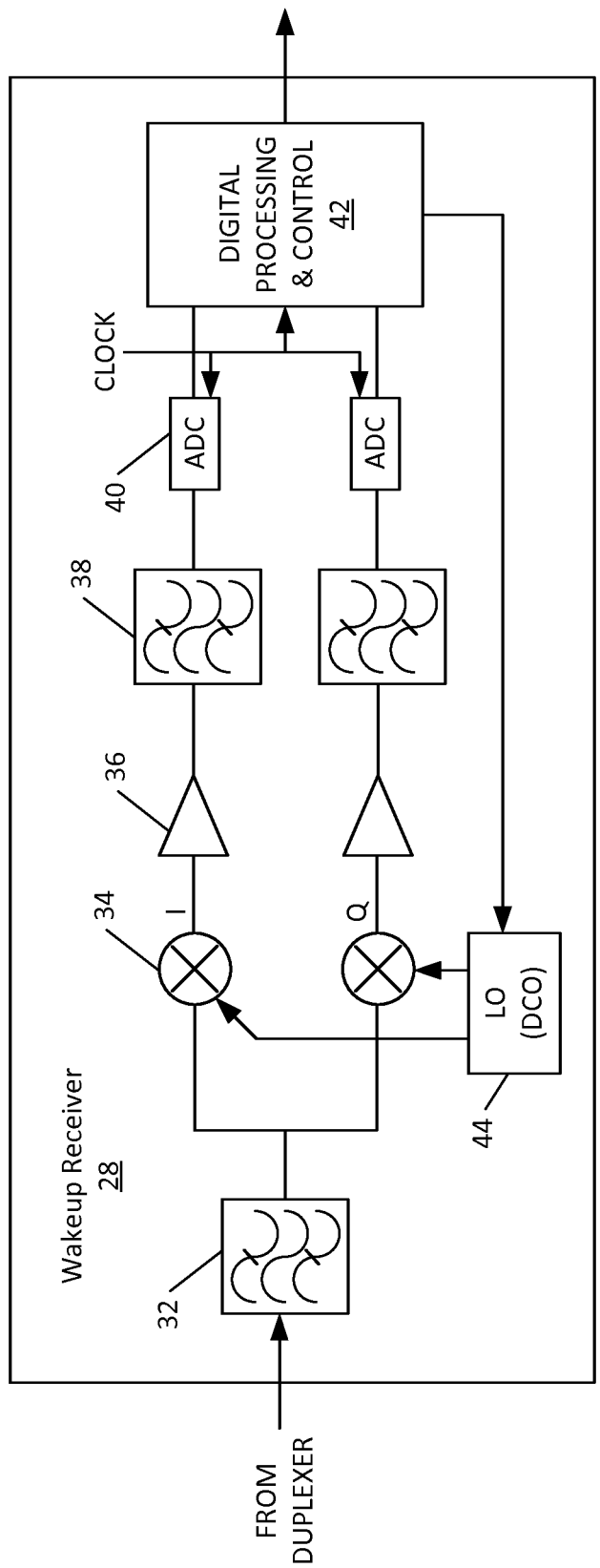
FIG. 2 is a block diagram of a wakeup receiver circuit.

FIG. 2 depicts the architecture of a wakeup receiver 28 according to one embodiment. The wakeup receiver 28 is a limited-function, low-power receiver intended to be activated by a wireless device 10 when a primary, full-function receiver 22 is in "sleep" mode for power conservation. The wakeup receiver 28 listens for a wakeup signal transmitted by the network (e.g., by a base station or eNB). If the decoded wakeup signal includes an ID associated with the wireless device 10, the wakeup receiver 28 outputs a signal to the wireless device 10—such as to a power management system 14 on the wireless device 10—to activate the primary receiver 22. The primary receiver 22 may then receive broadcasts such as System Information, and receive for paging messages. In this manner, the wireless device 10 may remain dormant, in a very low power consumption mode, for extended periods. However, during such dormant times, the wireless device 10, via the wakeup receiver 28, continues to monitor network transmissions, and hence the network need not repeat paging messages directed to the wireless device 10 when it has downlink data to transfer.

The wakeup receiver 28 comprises a front-end filter 32, mixer(s) 34, amplifier(s) 36, narrowband filter(s) 38, Analog to Digital (ADC) converter(s) 40, digital processing and control logic 42, and a Local Oscillator (LO) signal source 44. The LO source may be a Digitally Controlled Oscillator (DCO). The dual paths depicted in FIG. 1 reflect In-phase (I) and Quadrature (Q) mixing, although other mixers 34 may be employed. Operation of the wakeup receiver 28 is straightforward to those of skill in the art. A signal received at an antenna 26 (FIG. 1) and passed through a duplexer 24 for isolation from transmitter circuits 20 is initially filtered by front-end filter 32. Mixers 34 frequency downconvert received signals by mixing them with LO signals generated by the DCO 44, under the control of control logic 42. The mixer 34 may be a passive structure, to minimize power consumption and flicker noise. The mixer 34 precedes the amplifiers 36, the narrowband filters 38, and ADCs 40—hence, the wakeup receiver 28 employs a "mixer-first" architecture. ADC circuits 40 digitize the filtered baseband signal, and digital processing circuits 42 further process the signal, such as demodulating and decoding the transmitted data. If the data indicates that the wakeup signal was targeted to the wireless device 10 (for example, if it matches a unique identifier of the wireless device 10, such as IMSI, C-RNTI, or the like), the primary receiver 22 is activated to receive further messages from the network.

The DCO 44 is the major power consumer of the wakeup receiver 28. To minimize power consumption, no external frequency reference, such as a crystal oscillator, is used. Furthermore, phase locked loop designs are avoided, as they are heavy consumers of power. In one embodiment, a ring oscillator is used in the DCO 44 for ultra-low power consumption. Due to these power-saving design considerations, the DCO 44 is neither highly accurate nor particularly stable. That is, the output frequency of the DCO 44 LO signal will drift over time. Uncertainty in frequency propagates to the mixer circuits 34. Because of the uncertainty in the frequency downconversion performed by the mixers 34, the filters 38 must remain relatively wideband to avoid filtering out the baseband signal along with adjacent interference. That is, a more accurate LO signal from the DCO 44 would allow for more narrowband filtering by the filters 38, dramatically improving the signal to noise ratio (SNR) by eliminating nearby interference.

According to embodiments of the present invention, the network assists wakeup receivers 28 in maintaining more accurate frequency references by including information related to the transmission frequency in wakeup signals that are transmitted to wireless devices 10. The transmission frequency information may take numerous forms, as detailed herein. The transmitted wakeup signals may identify particular wireless devices 10 to which the network has data to transmit. Alternatively, even if the network has no occasion to "wake up" a particular wireless device 10, it nonetheless regularly transmits wakeup signals that include information related to their transmission frequency. All such wakeup signals may be monitored by wakeup receivers 28 in wireless devices 10, and used to calibrate the wakeup receivers' 28 local oscillator frequency generators. That is, even if a received and decoded wakeup signal does not identify a wireless device 10, that wireless device 10 may still improve its wakeup receiver 28 sensitivity and frequency accuracy by using the frequency information included in the received wakeup signal to calibrate or otherwise adjust its DCO 44, countering the effects of frequency drift. By transmitting wakeup signals according to a known time/frequency pattern, the network assists all low-power wireless devices 10 in a cell, which have wakeup receivers 28 as disclosed herein, to maintain accurate receiver clocks.

Initially, the wakeup receiver 28 must acquire a wakeup signal. In embodiments in which the network transmits wakeup signals according to a known pattern, the wakeup receiver 28 is tuned to, or near, the mid-frequency of the DCO 44, and listens for the duration of a wakeup signal transmission pattern period. If no wakeup signal is detected, the DCO 44 is tuned to a different frequency, and the process repeats. Once a wakeup signal is detected, in embodiments in which the network uses the same time interval between messages, the start time of the next wakeup message is known. Otherwise, the wakeup receiver 28 must tune to an expected frequency and begin listening at the earliest time that a wakeup message could be transmitted.

Figure 3:
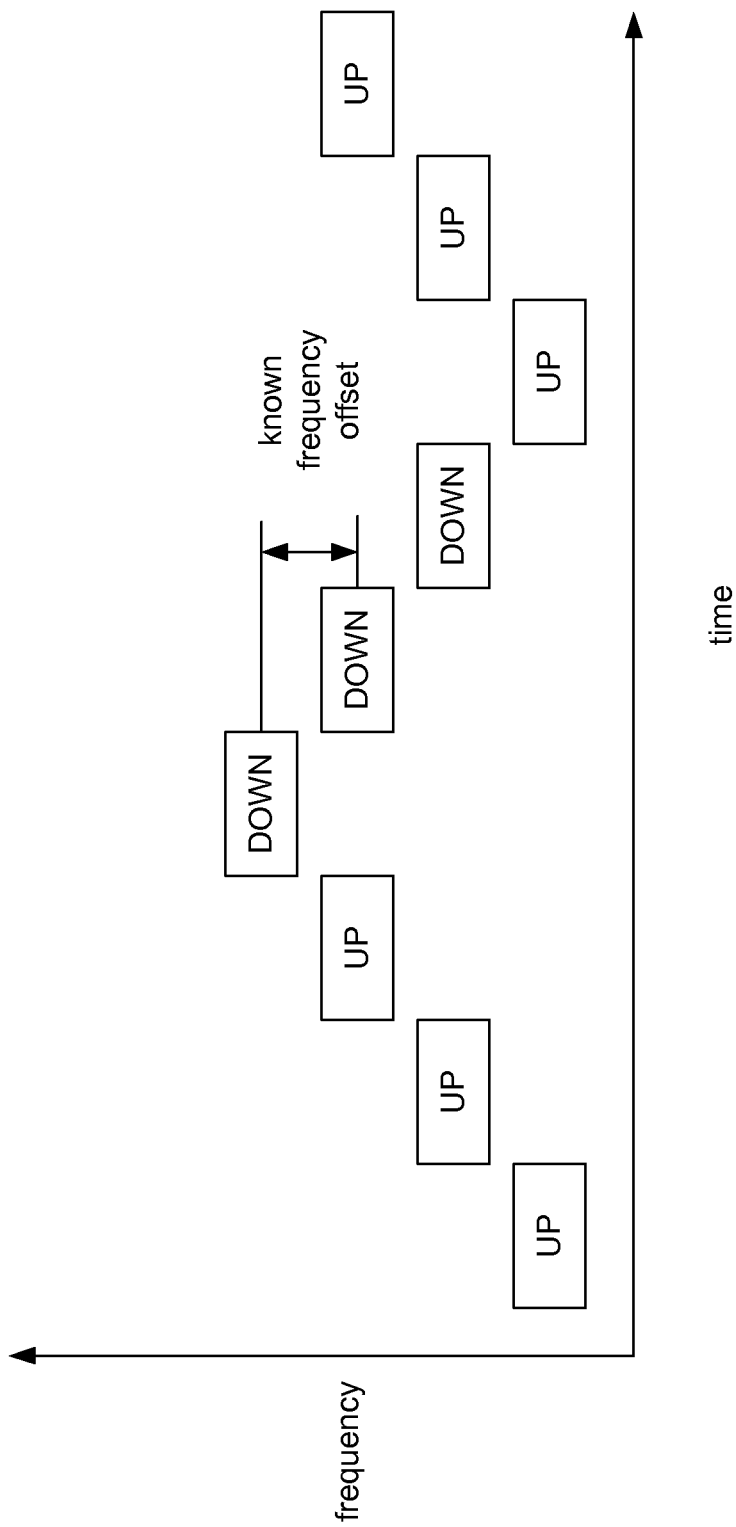
FIG. 3 is a time-frequency diagram depicting indicators for a triangular frequency hopping pattern.

In some embodiments, the network transmits wakeup messages in a known frequency hopping pattern, to help avoid interference. In these embodiments, the network may embed next-hop frequency information in each transmitted wakeup signal. In one embodiment, each wakeup signal may include the frequency of the next wakeup signal. In another embodiment, in which the frequency hopping pattern is triangular with known spacing, it is sufficient for each wakeup message to indicate whether the next wakeup message will be at a higher or lower frequency. In this embodiment, a single bit is sufficient to convey the information, and it can be represented by a relatively long sequence, to minimize the risk for errors. FIG. 3 depicts a simple triangular hopping pattern, in which each wakeup message need only carry an up/down indicator. In other embodiments, more complicated schemes use more bits, for example to facilitate skipping of frequencies with strong interference.

In another embodiment, a plurality of wakeup signals are transmitted simultaneously on different frequencies and each signal includes information identifying its transmission frequency. With a high likelihood, a wakeup receiver 28 will be able to receive one of the signals, whereas the other signals will be attenuated by the narrowband filters 38. Upon demodulating and decoding the data in the wakeup signal, the wakeup receiver 28 will know the signal's transmission frequency, and hence its own local oscillator frequency, and can use this information to calibrate its DCO 44. This approach is particularly useful when a wakeup receiver 28 is initially switched on (e.g., when a primary receiver 22 has been placed in a sleep mode for power conservation).

In the wakeup receiver 28, wakeup signals are received by a homodyne receiver where the local oscillator is free running. It is thus not locked in any PLL circuit, but instead it is calibrated at occasional or regular time intervals to limit errors due to frequency drift. Due to this, substantial frequency errors must be tolerated, and it must also be possible to measure these errors. Because of this frequency uncertainty, amplitude modulation is more suitable for the wakeup signals than phase modulation. The absolute frequency of the down-converted signal is then of less concern in the detection. In one embodiment (for example, that depicted in FIG. 1), the amplitude detection is performed in the digital domain by summation of the squared in-phase (I) and quadrature phase (Q) components. While in principle this is independent of intermediate frequency (IF), in real-world receivers 28, close to DC there are DC-offsets, 1/f noise, and even order intermodulation distortion, all of which should preferably by filtered out. It is therefore an advantage if a portion around DC can be filtered out, regardless of the actual IF frequency of the received signal. This is in contrast to regular homodyne receivers where the LO frequency is accurately locked. In that case, the signal can be tailored to have little information near its center frequency, which is then down-converted to DC. In contrast, in the wakeup receiver 28, the loss of information can occur anywhere in the signal spectrum, and is not necessarily confined to the center. Wakeup signals are thus advantageously constructed so that a loss can be handled anywhere in the signal bandwidth without loss of functionality.

In some embodiments, this is realized by using several carrier frequencies, each amplitude modulated using On-Off Keying (OOK). In particular, the transmitted signal is generated using an inverse fast Fourier transform (IFFT) block, where the different carrier frequencies are generated by using a set of sub-carriers. Specifically, the wakeup signal is generated using an ordinary OFDM transmitter.

Figure 4B:
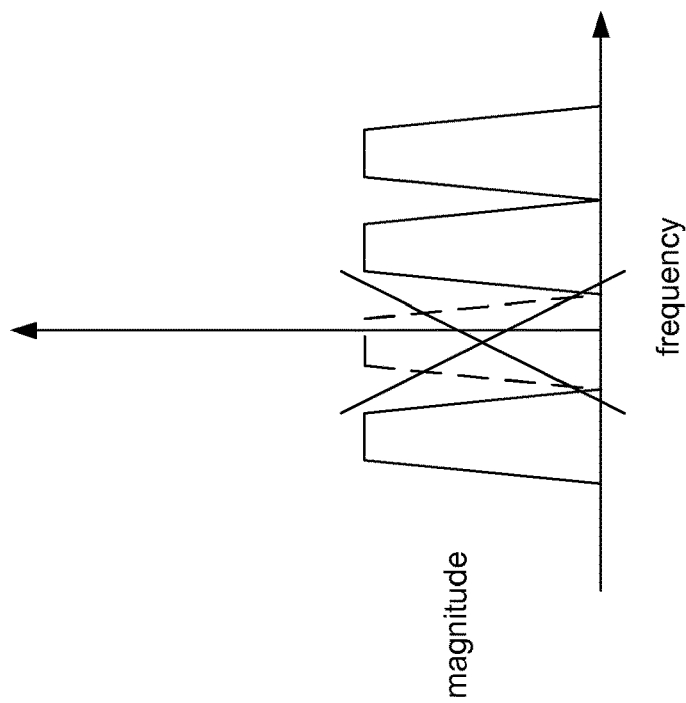
FIG. 4B is a frequency diagram depicting multiple carriers with a DC carrier discarded.
Figure 4A:
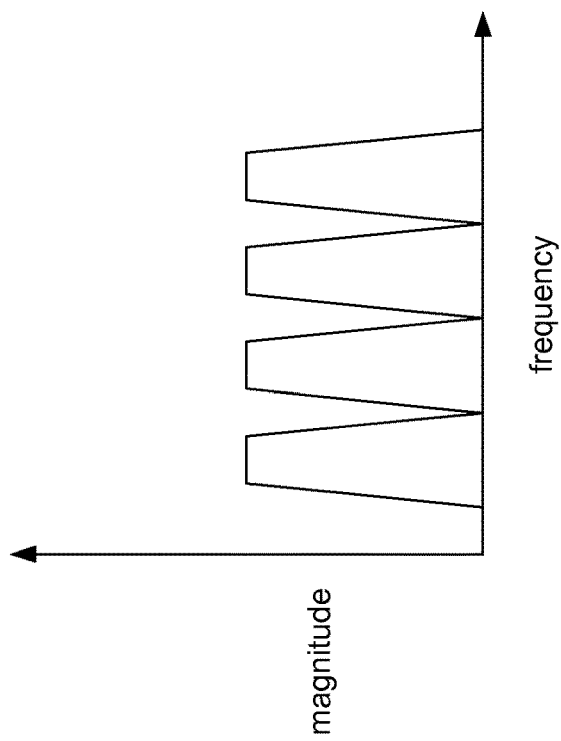
FIG. 4A is a frequency diagram depicting multiple, non-DC carriers.

Due to the ND conversion and digital signal processing in the wakeup receiver 28, each carrier can be filtered out in the digital domain before amplitude detection is performed. In one embodiment a bank of digital filters with different center frequencies is used. The filter outputs are amplitude demodulated and correlated for the different PN sequences of the wakeup message. In embodiments where the signal is generated using an IFFT, the filter-bank is effectively implemented using an FFT, similar to an ordinary OFDM receiver. The frequency offset is determined by which part of the message is found at which filter. Carriers at DC are not used, and their energy is lost. However, since the other carriers are uncorrupted by DC they are used instead, and their combined energy is used to detect the message. The signal situation after frequency down-conversion is illustrated in FIGS. 4A (no carriers at DC) and 4B (DC carrier not used).

Figure 5B:
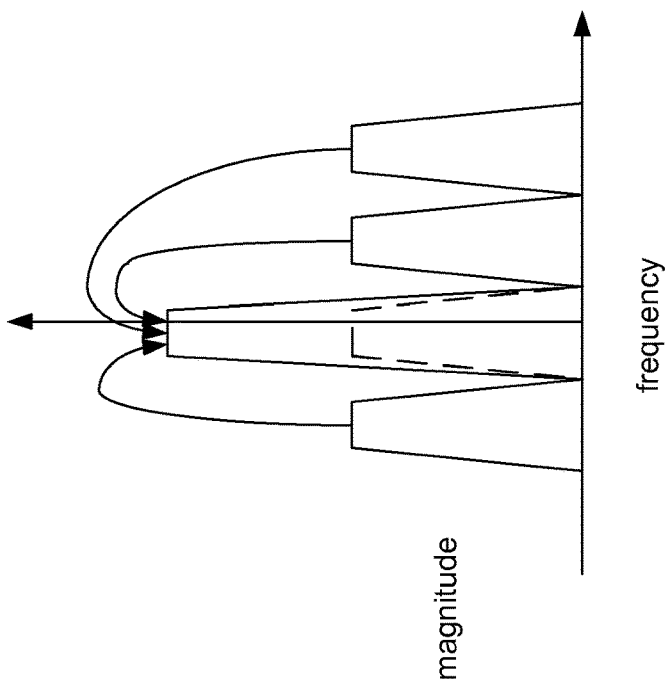
FIG. 5B is a frequency diagram depicting multiple carriers being mixed to DC.
Figure 5A:
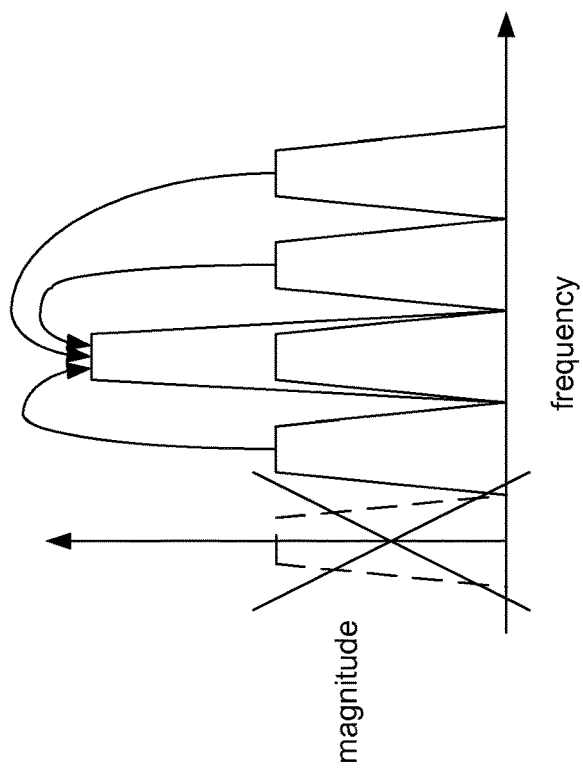
FIG. 5A is a frequency diagram depicting multiple carriers being mixed to a common frequency.

The pseudo noise (PN) sequence is selected in different ways, in different embodiments. In one embodiment, each wakeup signal on a different carrier contains a different PN sequence. In another embodiment, the same PN sequence is used in all wakeup signals. In the latter case, a digital mixer in the digital processing and control unit 42 may further downconvert all of the carriers to the same frequency, then perform amplitude detection and correlation together. This is depicted in FIG. 5A, where the wakeup signals transmitted on different carrier frequencies are mixed to the same, non-DC frequency and combined, resulting in improved signal strength and SNR. Alternatively, since the signals are in the digital domain, they can be mixed close to DC, as depicted in FIG. 5B.

Because it is not important for the detection at exactly what frequency the carriers end up, only that they end up at the same, the digital mixers must operate with a frequency equal to the difference frequency between carriers. As this frequency is low compared to the RF frequency, the digital frequency accuracy is relaxed. However, even though this difference frequency is low, due to uncertainty of time of arrival of the message, the local digital carrier phases will differ when receiving the signal. For constructive summation, the phase offsets must then be found and compensated for, e.g., with 90 degrees resolution, by switching the quadrature signals. In one embodiment, this is accomplished by using multiple digital mixers and correlators, so that mixing phase is always synchronized with correlation. Each set of mixers is then started in phase, the mixer outputs first added, then multiplied by +/−1 according to the PN sequence, after which the result is accumulated. Several such units are operated in parallel with different starting times to find the message.

To ascertain the LO frequency error in this embodiment, the outputs from different sets of filters are used in the signal detection, and the magnitude of the signal after the correlators is then compared to find the frequency location. In another embodiment, the carriers are demodulated individually; this is also done when different codes are used for different carriers. Those of skill in the art will recognize a trade-off between simplicity and sensitivity.

Figure 6:
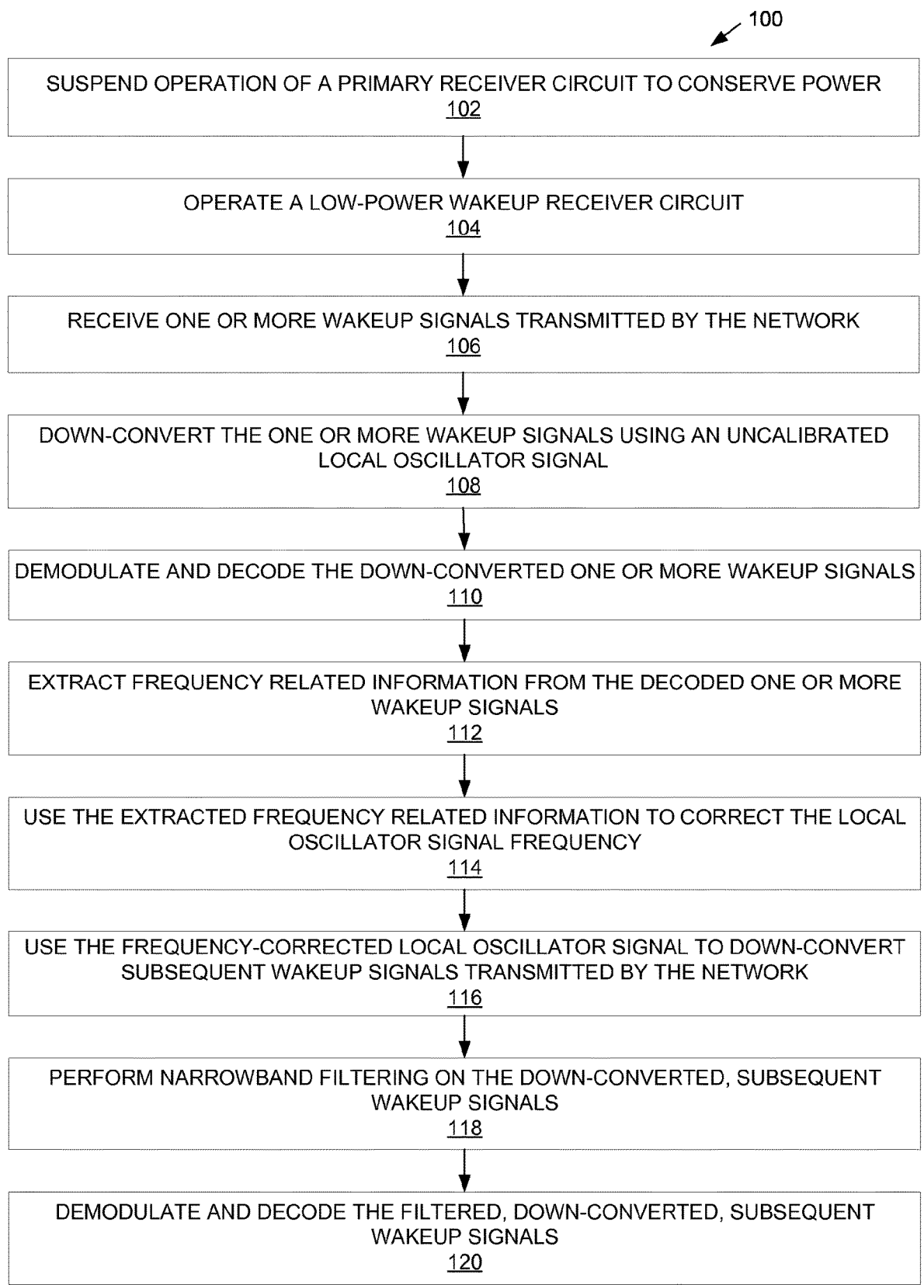
FIG. 6 is a flow diagram of a method of operating a low-power wakeup receiver in a wireless device operative in a wireless communication network.

FIG. 6 depicts a method 100 of operating a low-power wakeup receiver 28 in a wireless device 10 operative in a wireless communication network, in accordance with particular embodiments. Operation of a primary receiver circuit 22 is suspended to conserve power (block 102). A low-power wakeup receiver circuit is operated (block 104). One or more wakeup signals, transmitted by the network, are received (block 106). The one or more wakeup signals are down-converted using an uncalibrated local oscillator signal (block 108). The down-converted one or more wakeup signals are demodulated and decoded (block 110). Frequency related information is extracted from the decoded one or more wakeup signals (block 112). The extracted frequency related information is used to correct the local oscillator signal frequency (block 114). The frequency-corrected local oscillator signal is used to down-convert subsequent wakeup signals transmitted by the network (block 116). Narrowband filtering is performed on the down-converted, subsequent wakeup signals (block 118). The filtered, down-converted, subsequent wakeup signals are demodulated and decoded (block 120).

Figure 7:
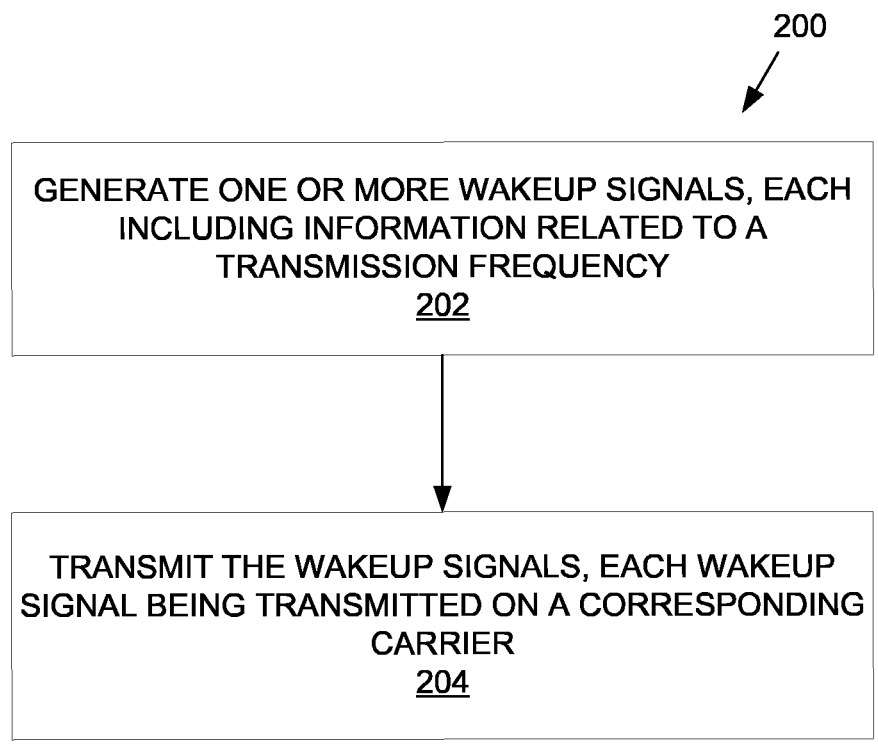
FIG. 7 is a flow diagram of a method of operating a base station serving one or more low-power wireless devices in a wireless communication network.

FIG. 7 depicts a method 200 of operating a base station serving one or more low-power wireless devices 10 in a wireless communication network, in accordance with other particular embodiments. One or more wakeup signals are generated (block 202). Each wakeup signal includes information related to a transmission frequency. The wakeup signals are transmitted (block 204). Each wakeup signal is transmitted on a corresponding frequency carrier.

Apparatuses described herein may perform the methods 100, 200 described herein, and any other processing, by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

As described above, FIG. 1 for example illustrates a wireless device 10 as implemented in accordance with one or more embodiments. In general, a wireless device 10 is any type of device capable of communicating with a network node and/or base station using radio signals. A wireless device 10 may therefore refer to a machine-to-machine (M2M) device, a machine-type communications (MTC) device, a Narrowband Internet of Things (NB IoT) device, etc. The wireless device 10 may also be a User Equipment (UE); however it should be noted that the UE does not necessarily have a "user" in the sense of an individual person owning and/or operating the device. A wireless device 10 may also be referred to as a radio device, a radio communication device, a wireless communication device, a wireless terminal, or simply a terminal—unless the context indicates otherwise, the use of any of these terms is intended to include device-to-device UEs or devices, machine-type devices, or devices capable of machine-to-machine communication, sensors equipped with a radio network device, wireless-enabled tablet computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but may be configured to transmit and/or receive data without direct human interaction.

A wireless device 10 as described herein may be, or may be comprised in, a machine or device that performs monitoring or measurements, and transmits the results of such monitoring measurements to another device or a network node. Particular examples of such machines are power meters, industrial machinery, or home or personal appliances, e.g. refrigerators, televisions, personal wearables such as watches etc. In other scenarios, a wireless device 10 as described herein may be comprised in a vehicle and may perform monitoring and/or reporting of the vehicle's operational status or other functions associated with the vehicle.

Figure 8:
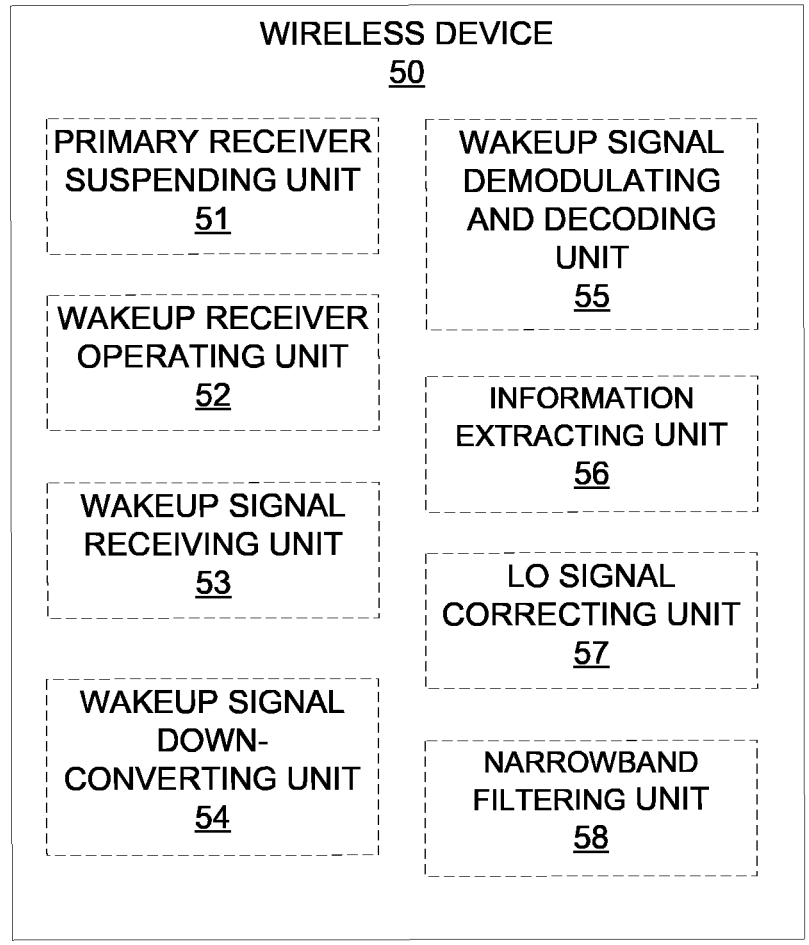
FIG. 8 is a block diagram of a wireless device showing functional units.

FIG. 8 illustrates a schematic block diagram of a wireless device 50 operative in a wireless communication network according to still other embodiments. As shown, the wireless device 50 implements various functional means, units, or modules, e.g., via the baseband processor 16, power management circuit 14, primary receiver 22, or wakeup receiver 28 in FIG. 1 and/or via software code. These functional means, units, or modules, e.g., for implementing method 100 herein, include for instance: primary receiver suspending unit 51, wakeup receiver operating unit 52, wakeup signal receiving unit 53, wakeup signal down-converting unit 54, wakeup signal demodulating and decoding unit 55, information extracting unit 56, LO signal correcting unit 57, and narrowband filtering unit 58.

The primary receiver suspending unit 51 is configured to suspend operation of a primary receiver circuit to conserve power. The wakeup receiver operating unit 52 is configured to operate a low-power wakeup receiver circuit. The wakeup signal receiving unit 53 is configured to receive one or more wakeup signals transmitted by the network. The wakeup signal down-converting unit 54 is configured to down-convert the one or more wakeup signals using an uncalibrated local oscillator signal. The wakeup signal demodulating and decoding unit 55 is configured to demodulate and decode the down-converted one or more wakeup signals. The information extracting unit 56 is configured to extract frequency related information from the decoded one or more wakeup signals. The LO signal correcting unit 57 is configured to use the extracted frequency related information to correct the local oscillator signal frequency. The wakeup signal down-converting unit 54 is further configured to use the frequency-corrected local oscillator signal to down-convert subsequent wakeup signals transmitted by the network. The narrowband filtering unit 58 is configured to performing narrowband filtering on the down-converted, subsequent wakeup signals. The wakeup signal demodulating and decoding unit 55 is further configured to demodulate and decode the filtered, down-converted, subsequent wakeup signals.

Figure 9:
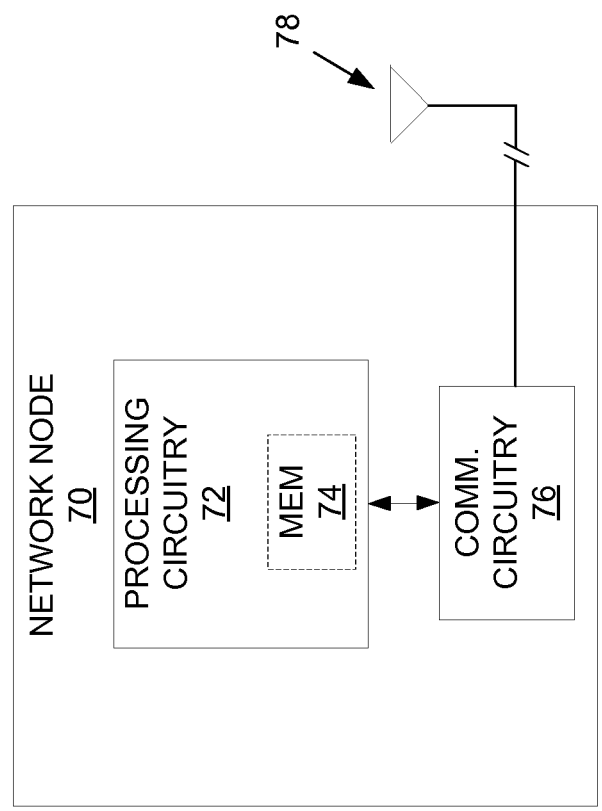
FIG. 9 is a block diagram of a network node.

FIG. 9 illustrates a network node 70 as implemented in accordance with one or more embodiments. In particular, the network node 70 may function as a base station in a wireless communication network. As those of skill in the art are aware, a base station is a network node 70 providing wireless communication services to one or more wireless devices 10 in a geographic region (known as a cell or sector). The base station 10 in LTE is called an e-NodeB or eNB; in NR it is known as gNB. However the present invention is not limited to LTE or NR. As shown, the network node 70 includes processing circuitry 72 and communication circuitry 76. The communication circuitry 76 is configured to transmit and/or receive information to and/or from one or more other nodes, e.g., via any communication technology. The communication circuitry 76 is connected to one or more antennas 78, to effect wireless communication across an air interface to one or more wireless devices 10. As those of skill in the art are aware, and as indicated by the continuation lines in the antenna feed line of FIG. 9, the antenna(s) 78 may be physically located separately from the network node 70, such as mounted on a tower, building, or the like. Although the memory 74 is depicted as being internal to the processing circuitry 72, those of skill in the art understand that the same or additional memory 74 may be separate from the processing circuitry 72. Those of skill in the art additionally understand that virtualization techniques allow some functions nominally executed by the processing circuitry 74 to actually be executed by other hardware, perhaps remotely located (e.g., in the so-called "cloud"). The processing circuitry 72 is configured to perform processing described above, such as by executing instructions stored in memory 74. The processing circuitry 72 in this regard may implement certain functional means, units, or modules.

Figure 10:
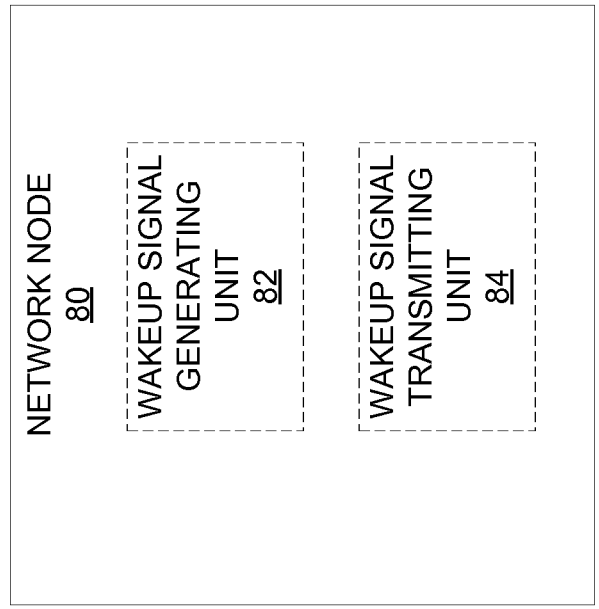
FIG. 10 is a block diagram of a network node showing functional units.

FIG. 10 illustrates a schematic block diagram of a network node 80 in a wireless network according to still other embodiments. As shown, the network node 80 implements various functional means, units, or modules, e.g., via the processing circuitry 72 in FIG. 9 and/or via software code. These functional means, units, or modules, e.g., for implementing the method 200 herein, include for instance: wakeup signal generating unit 82 and wakeup signal transmitting unit 84.

The wakeup signal generating unit 82 is configured to generate one or more wakeup signals, each including information related to a transmission frequency. The wakeup signal transmitting unit 84 is configured to transmit the wakeup signals, each wakeup signal being transmitted on a corresponding carrier.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Embodiments of the present invention present numerous advantages over the prior art. By frequency correcting a low-power, free-running DCO 44 using frequency information transmitted by the network in wakeup signals, a narrowband but ultra-low power wakeup receiver 10 is realized. It achieves high performance in terms of sensitivity and immunity to interference. The wakeup receiver 28 is quickly calibrated at startup, and remains calibrated despite drift in circuit parameters. In some embodiments, performance is further improved by using multiple carriers to achieve immunity to loss of parts of the signal spectrum, such as close to the LO frequency in a homodyne receiver. In other embodiments, immunity to interference is further improved by use of a frequency hopping mechanism, calibrating the wakeup receivers 28 for accurate operation over a full frequency band.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method of operating a wireless device operative in a wireless communication network, comprising a primary receiver circuit and a low-power wakeup receiver, the method comprising:
    suspending operation of the primary receiver circuit to conserve power;
    operating the low-power wakeup receiver circuit;
    receiving one or more wakeup signals transmitted by the network;
    down-converting the one or more wakeup signals using an uncalibrated local oscillator signal;
    demodulating and decoding the down-converted one or more wakeup signals;
    extracting frequency related information from the decoded one or more wakeup signals;
    using the extracted frequency related information to correct the local oscillator signal frequency;
    receiving subsequent wakeup signals transmitted by the network in a frequency hopping pattern, wherein each wakeup signal includes information related to the frequency location of a subsequent wakeup signal;
    using the frequency-corrected local oscillator signal to down-convert subsequent wakeup signals transmitted by the network;
    performing narrowband filtering on the down-converted, subsequent wakeup signals and
    demodulating and decoding the filtered, down-converted, subsequent wakeup signals.

2. The method of claim 1 further comprising:
    if a decoded wakeup signal identifies the wireless device, resuming operation of the primary receiver circuit.

3. The method of claim 1 wherein each wakeup signal comprises encoded data indicating the frequency of a carrier signal on which it was transmitted.

4. The method of claim 1 wherein the frequency hopping pattern is triangular with known frequency offsets, and each wakeup signal includes an indication whether a subsequent wakeup signal will be transmitted on a higher or lower frequency carrier.

5. The method of claim 4 wherein the wakeup receiver local oscillator signal is frequency-corrected when it correctly follows the pattern of transmitted wakeup signals.

6. The method of claim 1 wherein a plurality of wakeup signals is transmitted simultaneously, each on a different frequency carrier.

7. The method of claim 6 wherein each wakeup signal includes an identification of its carrier frequency.

8. The method of claim 6 wherein each wakeup signal encodes the same data, and further comprising:
   downconverting two or more carriers to the same frequency;
   combining the two or more carriers to form a combined signal; and
   demodulating the combined signal.

9. A wireless device operative in a wireless communication network comprising:
   a primary receiver circuit adapted to be suspended to conserve power;
   a low-power wakeup receiver circuit adapted to receive and process one or more wakeup signals transmitted by the network, the wakeup receiver circuit comprising:
      a digitally controlled oscillator adapted to generate a local oscillator signal;
      a mixer receiving the local oscillator signal and the received one or more wakeup signals and adapted to frequency down-convert the received one or more wakeup signals;
      a filter downstream of the mixer; and
      a digitization and digital processing circuit downstream of the filter and adapted to demodulate and decode the one or more wakeup signals and extract frequency related information from the decoded one or more wakeup signals;
   wherein the wakeup receiver is adapted to:
      use the extracted frequency related information to correct the local oscillator signal frequency;
      use the frequency-corrected local oscillator signal to frequency down-convert subsequent wakeup signals transmitted by the network;
      perform narrowband filtering on the down-converted subsequent wakeup signals; and
      demodulate and decode the filtered, down-converted, subsequent wakeup signals;
   wherein the wakeup signals are transmitted on a frequency hopping pattern to minimize interference and each wakeup signal includes information related to a frequency location of a subsequent wakeup signal;
   wherein each wakeup signal encodes data indicating the frequency of a carrier signal on which it was transmitted, and wherein the digital processing circuits are adapted to extract frequency related information from the received wakeup signals by decoding the carrier signal frequency data.

10. The wireless device of claim 9 wherein the narrowband filtering is operative to filter out interference and improve demodulation performance.

11. The wireless device of claim 9 wherein the wakeup receiver further comprises a front-end filter upstream of the mixer.

12. The wireless device of claim 9 wherein the digitally controlled oscillator is a ring oscillator.

13. The wireless device of claim 12 wherein the frequency hopping pattern is triangular with known frequency offsets, and each wakeup signal includes an indication whether a subsequent wakeup signal will be transmitted on a higher or lower frequency carrier.

14. The wireless device of claim 13 wherein the wakeup receiver local oscillator signal is frequency-corrected when it correctly follows the pattern of transmitted wakeup signals.

15. The wireless device of claim 9 wherein a plurality of wakeup signals is transmitted simultaneously, each on a different frequency carrier.

16. The wireless device of claim 15 wherein each wakeup signal includes an identification of its carrier frequency.

17. The wireless device of claim 15 wherein each wakeup signal encodes the same data, and wherein the wakeup receiver is further adapted to downconvert two or more carriers to the same frequency and combine them prior to demodulating the combined signal.

18. The wireless device of claim 9 further comprising a power management system adapted to resume operation of the primary receiver circuit in response to the wakeup receiver circuit receiving a wakeup signal identifying the wireless device.

19. A method of operating a base station serving one or more low-power wireless devices in a wireless communication network, comprising:
   generating one or more wakeup signals, each including information related to a transmission frequency; and
   transmitting the wakeup signals, each wakeup signal being transmitted on a corresponding carrier, on a frequency hopping pattern to increase robustness against interference, wherein each wakeup signal includes information related to the frequency location of a subsequent wakeup signal.

20. The method of claim 19 wherein each wakeup signal is transmitted on a subcarrier of an OFDM signal.

21. The method of claim 19 wherein each wakeup signal comprises encoded data indicating the frequency of a carrier signal on which it was transmitted.

22. The method of claim 21 wherein the frequency hopping pattern is triangular with known frequency offsets, and each wakeup signal includes an indication whether a subsequent wakeup signal will be transmitted on a higher or lower frequency carrier.

23. The method of any of claim 19 wherein transmitting the one or more wakeup signals comprises simultaneously transmitting a plurality of wakeup signals, each on a different frequency carrier.

24. The method of claim 23 wherein each wakeup signal includes an identification of its carrier frequency.

25. The method of claim 23 wherein each wakeup signal encodes the same data.

26. A base station operative in a wireless communication network, comprising:
   a transceiver; and
   processing circuitry operatively connected to the transceiver, and adapted to
      generate one or more wakeup signals, each including information related to a transmission frequency; and
      transmit the wakeup signals, each wakeup signal being transmitted on a corresponding carrier, on a frequency hopping pattern to increase robustness against interference, wherein each wakeup signal includes information related to the frequency location of a subsequent wakeup signal.

27. The base station of claim 26 wherein each wakeup signal is transmitted on a subcarrier of an OFDM signal.

28. The base station of claim 26 wherein each wakeup signal encodes data indicating the frequency of a carrier signal on which it is transmitted.

29. The base station of claim 28 wherein the frequency hopping pattern is triangular with known frequency offsets, and each wakeup signal includes an indication whether a subsequent wakeup signal will be transmitted on a higher or lower frequency carrier.

30. The base station of claim 26 wherein the processing circuitry is adapted to transmit the one or more wakeup signals by simultaneously transmitting a plurality of wakeup signals, each on a different frequency carrier.

31. The base station of claim 30 wherein each wakeup signal includes an identification of its carrier frequency.

32. The base station of claim 30 wherein each wakeup signal encodes the same data.

\* \* \* \* \*